United States Patent [19]

Welch

[11] Patent Number: 4,725,750
[45] Date of Patent: Feb. 16, 1988

[54] PERMANENT MAGNET ROTARY MACHINE

[75] Inventor: Elvin C. Welch, Torrance, Calif.

[73] Assignee: Hughes Aircraft Company, Los Angeles, Calif.

[21] Appl. No.: 533,155

[22] Filed: Sep. 16, 1983

Related U.S. Application Data

[63] Continuation of Ser. No. 208,892, Nov. 20, 1980, abandoned, which is a continuation of Ser. No. 973,835, Dec. 28, 1978, abandoned.

[51] Int. Cl.⁴ .................................... H02K 21/12
[52] U.S. Cl. ........................................ 310/156
[58] Field of Search ............................. 310/156, 261

[56] References Cited

U.S. PATENT DOCUMENTS

| | | | |
|---|---|---|---|
| 1,543,347 | 6/1925 | Turner et al. | 310/156 |
| 1,958,043 | 5/1934 | Heintz | 310/156 |
| 3,840,763 | 10/1974 | Baumann et al. | 310/156 |
| 4,127,786 | 11/1978 | Volkrodt | 310/156 |

*Primary Examiner*—Donovan F. Duggan
*Attorney, Agent, or Firm*—Leonard A. Alkov; A. W. Karambelas

[57] ABSTRACT

A rotary machine such as a motor or generator is disclosed wherein the rotor has three magnetic components. One of the components also acts as a rotor frame. The rotor frame has a group of wedge-shaped openings which are evenly spaced and peripheral to the frame. Another magnetic component, permanently magnetized and hollow on its inside, is also wedge-shaped and is inserted in each first mentioned wedge-shaped opening of the frame. A third magnetic component, conforming to the hollow inside surface of the permanent magnet is buried within and thereby surrounded by each such hollowed magnet. Such third magnetic component is solid throughout its entire cross-section. The wedge-shaped structures of the rotor provide the required magnetic polarities and field for coacting with the fields provided by the stator. The stator has a like number of poles as the number of wedge-shaped magnetic structures, each pole being polarized by passing a current through each coil wound on each pole, so that the poles are of north and south polarities, in alternation, similar to the polarities produced by the rotor. The stator also has an additional similar number of poles for providing a second group of windings to be used as a starting winding in conjunction with a starting capacitor in series with such winding when the machine is used as a motor, or without the capacitor to enable such machine to be used as a multiple phase AC motor or generator. When used as a generator, the shaft of the rotor is driven and multi-phase AC power output is obtained at the terminals of the two groups of coils wound on the poles of the stator.

3 Claims, 4 Drawing Figures

PERMANENT MAGNET ROTARY MACHINE

UNITED STATES GOVERNMENT INTEREST

The government has rights in this invention pursuant to Contract No. F29601-C-0087 awarded by Department of the Air Force.

This application is a continuation of application Ser. No. 208,892, filed Nov. 20, 1980, now abandoned, in turn a continuation of application Ser. No. 973,835, filed Dec. 28, 1978, now abandoned.

BACKGROUND OF THE INVENTION

This invention is in the field of rotary machinery, of the electric motor or generator type.

Prior art machines have magnetic rotor structures which provide rotary action. However, such prior art machines are not able to utilize high energy density magnets and are not able to provide a strong torque because the flux density in gaps or spaces between the rotor and stator is low.

Such prior art machines also do not provide the high flux density in such spaces inasmuch as they have undesirable leakage fluxes at location other than the spaces or gaps, which result in such prior art machinery having reduced efficiency as torquers or generators.

Prior art machines are also bulky and relatively heavy, due to the use of massive quantities of low energy density magnets and iron poles, which make them unusable in applications such as airborne vehicles which require devices of low weight and small volume.

SUMMARY OF THE INVENTION

A magnetic machine for creating rotary motion is provided, which also creates a strong magnetic flux utilizing relatively low flux density but high energy density magnetic material.

Three types of magnetic components are used, one such component being the outer rotor frame. Other such components within the outer frame comprise V-shaped, pie-shaped or wedge-shaped hollow permanent magnets, spaced regularly about the rotor periphery within the confines of the rotor outer frame. A soft iron or like core of solid cross-section throughout is embedded in each of these wedge-shaped permanent magnets.

The embedded core increases the flux density in spaces between the rotor and stator and also serves to decrease leakage flux at locations other than in such spaces.

Thus, coaction between the embedded cores and the permanent magnets in which the core is retained, results in amplified magnetic fields and increased rotor torques.

The machine has coils wound on poles integral with the stator, wherein the coils are shown serially interconnected, although such coils may be connected in parallel. A current passed through the coils creates a magnetic field which interacts with the magnetic field of the rotor to provide rotational torque, when such machine is used as a motor.

A like number of sets of windings on the same poles but in special phase shift position with respect to the first mentioned coils, and each coil being intermediate a pair of the first set of coils, connected in series with a capacitor is utilized to obtain a rotating field providing sufficient starting torque for the motor. When used as an AC generator such rotor is driven by an external prime mover and the two-coil sets provide a two-phase output.

Because the magnetic structure uses embedded cores with solid cross-section, it is possible to obtain a machine which provides high flux density in the spacing between the rotor and the stator poles, and also to obtain low leakage fluxes in locations other than such spacings. This is accomplished by using low flux density permanent magnetic structures in the rotor structure in conjunction with the solid cross-sectional cores embedded in such permanent magnet structures. Such machine produces high force vectors and high rotational torques as well as being lightweight and relatively small in volume.

DETAILED DESCRIPTION

Figure 1:
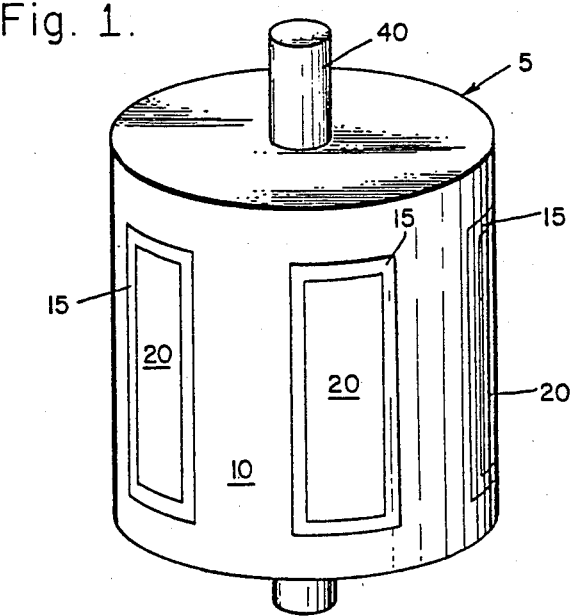
FIG. 1 is a perspective view of a generally cylindrically shaped rotor in accordance with the invention.
Figure 2:
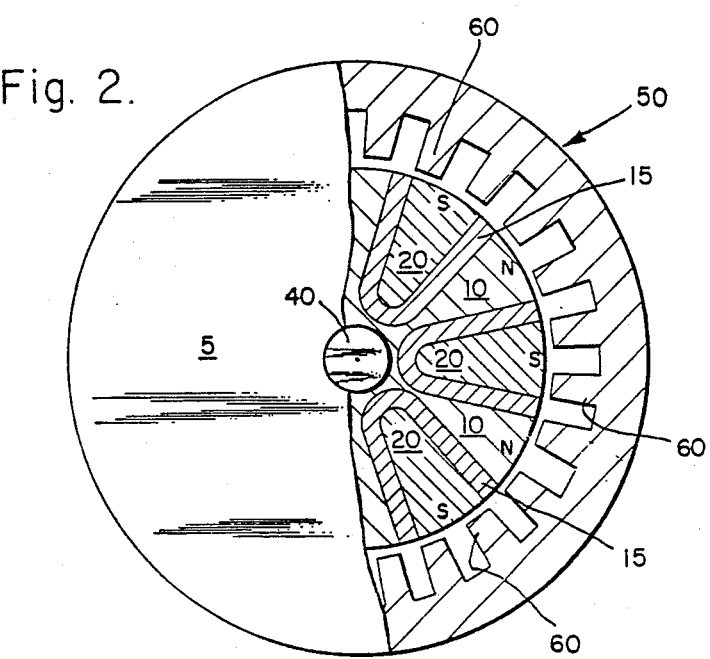
FIG. 2 is a view partially in cross-section of the rotor and partially in elevation showing both the rotor and stator assembled.
Figure 3:
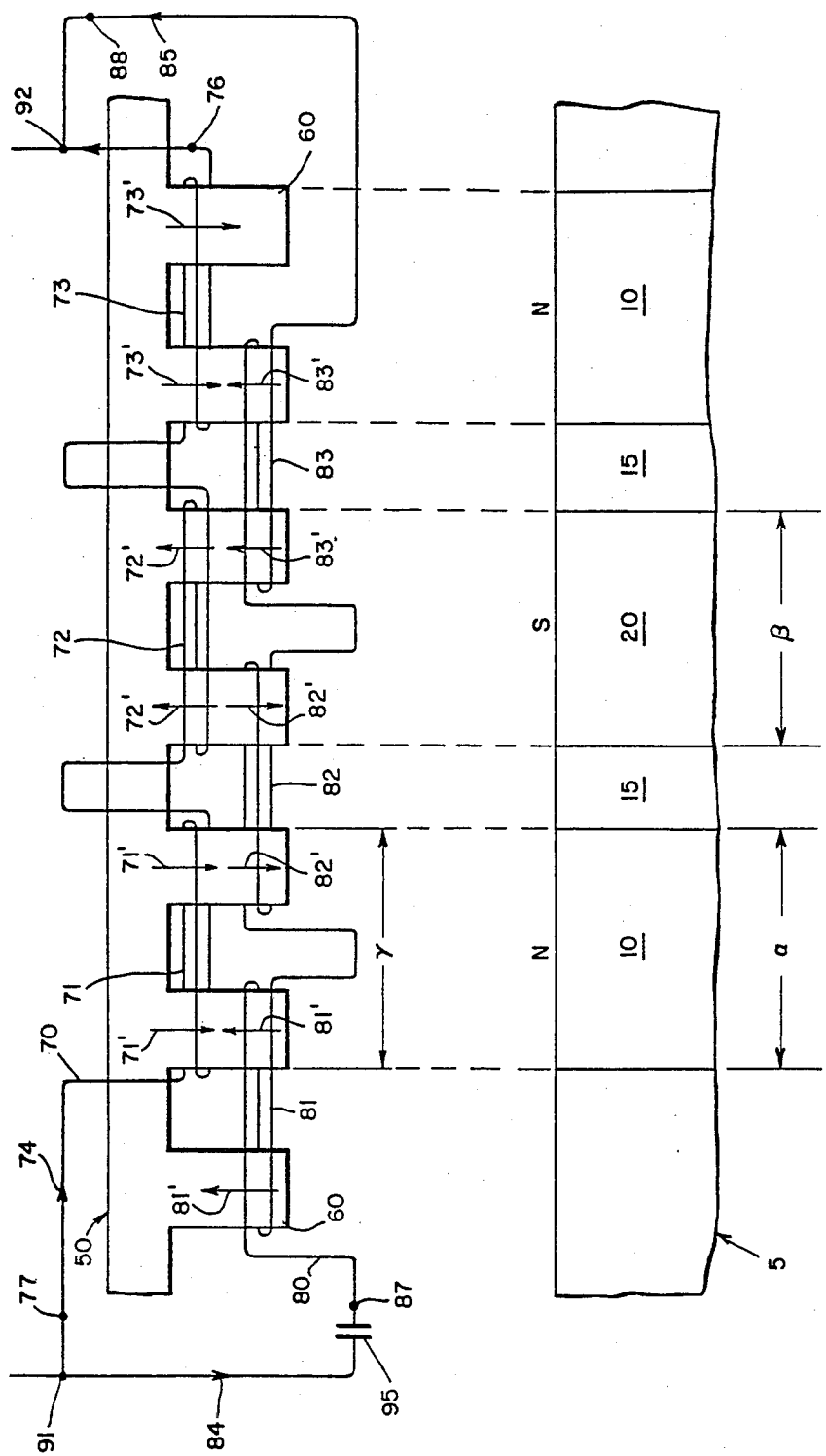
FIG. 3 is an electromechanic schematic representation of a portion of the rotor and stator showing the manner of winding interconnections.

Referring to FIGS. 1-3, the electric rotary machine illustrated comprises a rotor having an outer ferromagnetic cylindrically-shaped frame or enclosure 10, generally of soft magnetizable iron, and a stator 50 encircling the rotor and having poles 60 extending inwardly towards the center of the machine. The effect of this assembly is to shorten the length of the magnetic flux path within the machine.

Although such machine is shown in a generally cylindrical shape, it is pointed out that it may have any desired shape consistent with other specified requirements stated below. The machine illustrated is used to provide a high torque when used as AC motor. This machine may also be used as two-phase AC generator when capacitor 95 is removed and windings 70 and 80 are respectively disconnected from common connections 91 and 92, so that winding 70 may be connected to an external load at points 76 and 77, and winding 80 may likewise be independently connected to another load at points 87 and 88. In the AC generator utilization, rotor 5 is driven by means of shaft 40 in bearings, not shown, and driven by an external prime mover, not shown. It is of course appreciated that such AC generator may have more than two phases if additional poles 60 and additional windings such as 70 or 80 are provided.

The machine is shown in FIG. 3 in simplified form to illustrate the principle of operation, though generally such machine may have 24 poles such as 60 and a corresponding increase in windings 70 and 80.

FIG. 3 shows a portion of the rotor 5 and stator 50 and shows a typical relationship of the angular distances of components 10 and 20 of the rotor at the rotor periphery and a pole pair 60 of the stator at its inner periphery. The angular distance $\alpha$ of component 10 is equal to the angular distance $\beta$ of component 20, and each of $\alpha$ or $\beta$ are equal to the angular distance $\gamma$ representing the peripheral arc made by two pole pieces 60 of the stator.

The winding arrangement of the stator 50 is such that each of windings 71, 72, 73 and other like windings, not shown, of winding group 70, share a pair of pole pieces 60, with windings 81, 82, 83 and other like windings, not shown, of winding group 80. Windings 71, 72 and 73 are serially interconnected, and alternate windings of the groups 71, 72 and 73 are wound in opposite directions so as to provide an opposite magnetic flux path in their respective pole pieces 60, and consequently provide opposite magnetic polarities at those poles. Accordingly, winding 71 is seen to have magnetic flux lines 71' on an adjacent pair of pole pieces 60, the arrowheads pointing inwardly toward the axis of rotation of the machine rotor and being indicative of the north magnetic poles which are created at those two adjacent pole pieces 60. Winding 72 generates magnetic flux 72' which creates a north magnetic pole away from the axis of the rotor, while winding 7 generates a magnetic flux 73' which creates north magnetic poles at ends of pole pieces 60 in closer proximity to the axis of rotation of such rotor.

Likewise, winding 81 is shown to have magnetic flux lines 81', winding 82 to have magnetic flux lines 82' and winding 83 to have magnetic flux lines 83' wherein the arrowheads of such flux lines represent the north magnetic poles at pole pieces 60.

It is therefore obvious that magnetic flux lines 71' and 81' are in magnetic pole opposition while the flux in the next adjacent pole piece 60 shows flux lines 71' and 82' in magnetic aiding polarities. Such magnetic polarity opposition and magnetic polarity aiding are in alternation throughout stator 50 at any one instant of time.

Thus, in relation to either component 10 or 20 of the rotor, providing alternating north and south magnetic poles, there will be present one magnetic north pole, due to windings 71, a portion of winding 81 and a portion of winding 82, opposite the indicated north pole of component 10 and there will also be present one magnetic south pole, due to winding 72, a portion of winding 82 and a portion of winding 83, opposite component 20 which has a permanent south magnetic pole. In such manner, the two windings 70 and 80 will provide spacial magnetic north and south poles in alternation for any one instance of time.

Additionally, there will also be provided a 90 degree electrical phase shift due to capacitor 95 being in series with winding 80, which will add to the spacial magnetic polarity shift so that in affect, a rotating magnetic field will be provided by stator 50 when the machine is operating as a motor due to the two magnetic fields in phase displacement produced by the AC single phase current flowing in winding 70 and 80 when terminals 91 and 92 are connected to an external AC single phase power source.

When rotor 5 is driven as a generator, as above stated, the illustrated machine will produce a two phase output when capacitor 95 is removed, winding 70 is disconnected at 76 and 77, and winding 80 is disconnected at 87 and 88 from the common junction points of these windings.

Permanent magnets 15, are of V-shaped, pie-shaped or wedge-shaped structure, regularly spaced about the rotor periphery and embedded within frame 10. Such permanent magnets 15 are made of hard magnetic material such as Alnico or Samarium-Cobalt, for example.

A magnetic core 20 conforming to the shape of magnet 15, is retained within each magnet 15 and is of solid material substantially throughout its entire cross-section filling the entire inner area of magnet 15. Core 20 may be made of a ferromagnetic material such as soft low carbon iron, vandium permendur, nickel, cobalt or combinations thereof.

The outer shell of stator 50 is mounted by conventional bearing means, not shown, so that shaft 40 of the rotor can be rotated freely in such bearings.

The stator is illustrated in a pole piece 60 configuration for simplicity of explanation, wherein pole piece 60 are integral with housing stator 50. Coil set 71, 72 and 73 are shown in series as well as set 81, 82 and 83, although such coils may be connected in parallel taking account of the direction of winding so as to produce flux directions as indicated above.

Thus, there is present magnetic flux in spaces or gaps between the rotor and the poles of the stator which is substantially the only flux that is present in the machine to create high torques, when the machine is used as a motor.

A large flux density, or gauss, will be produced in gaps between the rotor and stator utilizing low flux density, but high energy density material such as the material out of which magnets 15 are constructed. This is possibly by virtue of the use of solid magnetic cores 20, each completely buried within its respective magnet 15, and due to the ratio of the buried and exposed surface areas of cores 20.

Figure 4:
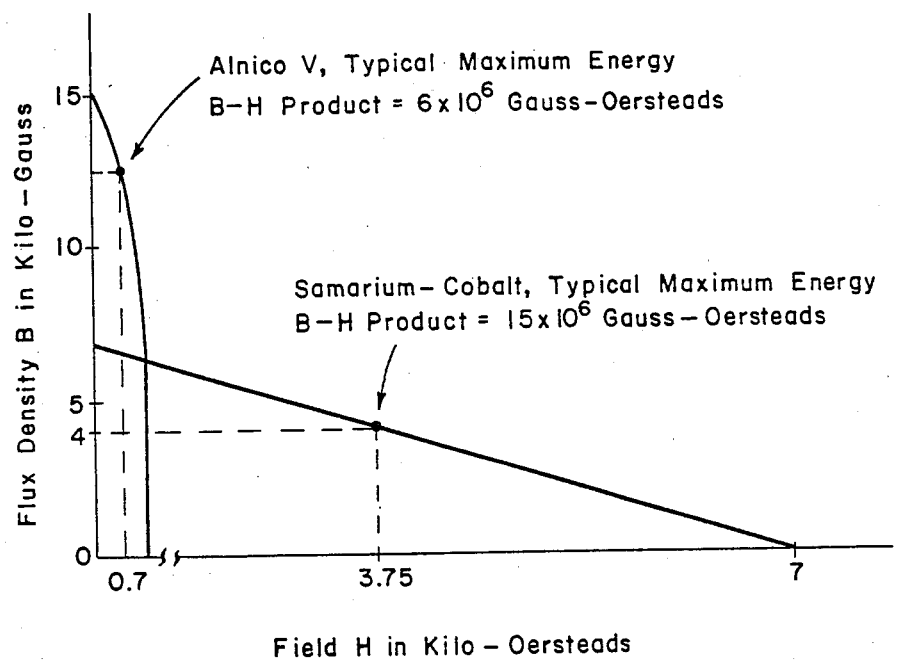
FIG. 4 is a B-H curve of magnetic material utilized in the rotor of FIG. 1.

Referring to FIG. 4, it should be remembered that in utilization of a machine that provides a torque due to magnetic action, that such torque is proportional to the flux density in the space between the exposed faces of cores 10 and 20 and the stator projections 60 but the weight and volume of permanent magnet material required is proportional to its B-H product.

Hence, it may be seen from such figure, that the high energy product of Samarium-Cobalt material has its maximum B-H product point at a low flux density, in the order to 4 to 6 kilogauss, and a high performance magnetic device requires a high spacing or gap flux density, in the order to 10 to 15 kilogauss.

Hence, the technique of burying cores 20, and adjusting the ratio of buried and exposed surface areas, is the only way to achieve the desired high flux density in spacings or gaps between rotor and stator with a low flux density but high energy density magnetic material, out of which magnetic cores 15 are made.

It is also pointed out that efficient rotor design dictates that each peripheral segment $\alpha$ of material 10 should be substantially equal to in length to each peripheral segment $\beta$ of core 20, and that either shall be equal in width of a pair of pole pieces 60, including the spacing therebetween.

It is also pointed out that the magnetic components comprising rotor 5 can be interchanged with the magnetic components comprising stator 50, so that winding groups 70 and 80 will be installed on poles similar to pole pieces 60 on the rotary portion of the machine and magnetic components 10, 15, and 20 will be installed in alternation on the inner periphery of the stationary portion of this machine. In this case it will be necessary to provide slip rings insulated from shaft 40 and brushes in cooperation with the slip ringgs for connecting windings 70 and 80 to an external AC power means when operated as a motor, or such slip rings would be used to provide multi-phase outputs from windings 70 and 80 when driven as a generator. Ferromagnetic casing 10 is permanently magnetized by virtue of permanent magnets 15 secured within such frame.

What is claimed is:

1. A permanently magnetized rotor (5) for a magnetic machine, wherein said rotor (5) comprises:
   a frame (10) made of a first soft ferromagnetic material, said frame (10) having a plurality of regularly spaced cavities therein;
   contoured permanent magnetic elements (15) lining all surfaces of respective cavities and filling a portion of the respective cavities; and
   magnetic structures (20) made of a second soft ferromagnetic material and having substantially solid cross-sections, retained in contact with the entire inner contoured surfaces of respective contoured magnetic elements (15) and filling the remainder of each of said cavities;
   wherein said cavities are spaced and sized and the configurations of magnetic elements 15 and magnetic structures 20 are such that each magnetic structure 20 and an adjacent frame area 10 have approximately equal surface areas exposed to the air gap within said magnetic machine.

2. The permanently magnetized rotor of an electric machine as defined in claim 1, wherein said contoured magnetic components are wedge-shaped from permanent magnets made from hard magnetic material.

3. The magnetic machine as defined in claim 2, wherein said frame is a cylindrical shape.

* * * * *